US006977896B1

(12) United States Patent
Kobayashi (10) Patent No.: US 6,977,896 B1
(45) Date of Patent: Dec. 20, 2005

(54) IP COMMUNICATIONS NETWORK SYSTEM AND QOS GUARANTEEING APPARATUS

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 09/587,352

(22) Filed: Jun. 5, 2000

(30) Foreign Application Priority Data

Aug. 3, 1999 (JP) .................................. 11-220419

(51) Int. Cl.$^7$ ............................................. H04L 12/56
(52) U.S. Cl. ..................... 370/235; 370/389; 370/401
(58) Field of Search ................................ 370/229, 230, 370/231, 232, 235, 241, 252, 253, 389, 401

(56) References Cited

U.S. PATENT DOCUMENTS

| 6,069,889 | A | * | 5/2000 | Feldman et al. ............ 370/351 |
| 6,091,709 | A | * | 7/2000 | Harrison et al. ............ 370/235 |
| 6,418,139 | B1 | * | 7/2002 | Akhtar ....................... 370/356 |
| 6,519,254 | B1 | * | 2/2003 | Chuah et al. ................ 370/389 |
| 6,538,416 | B1 | * | 3/2003 | Hahne et al. ............... 370/431 |

OTHER PUBLICATIONS

Pan et al. "Staged REfresh Timers for RSVP" IEEE. Nov. 3, 1997-Nov.8, 1997. pp. 1909-1913.*
Guerin et al. "Aggreating RSVP-based QoS Requests draft-guerin-aggreg-rsvp-00.txt" IETF. Nov. 21, 1997. pp. 1-19.*
Terzis et al. "RSVP Operations Over IP Tunnels draft-ietf-rsvp-tunnel-03.txt", IETF. Apr. 1999. pp. 1-22.*
Terzis et al. "Reservations for Aggregate Traffic: Experiences from an RSVP Tunnels Implementation". IEEE. May 18, 1998-May 20, 1998. pp. 23-25.*
Braden et al. "RFC 2205—Resource Reservation Protocol RSVP)—Version 1 Functional Specification". RFC 2205. Sep. 1997. pp. 1-112.*
Braden et al. "RFC 2205 - Resource Reservation Protocol RSVP) - Version 1 Functional Specification", RFC 2205. Sep. 1997. pp. 1-112.*

* cited by examiner

Primary Examiner—Ricky Ngo
Assistant Examiner—Derrick W. Ferris
(74) Attorney, Agent, or Firm—Katten Muchin Rosenman LLP (57) ABSTRACT

An IP communications network system comprises a first QoS guaranteeing apparatus including a distinguishing unit for classifying target traffics in order to guarantee, based on a QoS guarantee protocol, a quality of a set of specified data packets accordant with a specified condition among data packets transmitted from a multiplicity of data communications terminals, an encapsulating unit for encapsulating the specified data packets defined as a QoS guarantee target on the basis of addresses of QoS guaranteeing apparatuses existing on the sides opposite to each other in a QoS guarantee target area in an IP packet switching network so that a set of the traffics appear as if being one session, and a resource reserving unit for reserving resources in accordance with the QoS guarantee protocol with respect to the set of encapsulated specified data packets. With this architecture, the QoS as to a delay, etc. can be guaranteed with respect to a set of burst data transmitted at random from a multiplicity of terminals by applying the RSVP as a standard of QoS guarantee protocol.

23 Claims, 8 Drawing Sheets

| DESTINATION ADDRESS | ADDRESS OF PAIRED QoS GUARANTEEING APPARATUS |
|---|---|
| ADDRESS OF SERVER/HOST COMPUTER 80 | ADDRESS OF QoS GUARANTEEING APPARATUS 30 |
| ADDRESS OF SERVER/HOST COMPUTER 81 | ADDRESS OF QoS GUARANTEEING APPARATUS 31 |

FIG.9

| DESTINATION ADDRESS | ADDRESS OF PAIRED QoS GUARANTEEING APPARATUS |
|---|---|
| ADDRESS OF EACH CLIENT TERMINAL EXISTING IN SUBNETWORK 40 | ADDRESS OF QoS GUARANTEEING APPARATUS 20 |
| ADDRESS OF EACH CLIENT TERMINAL EXISTING IN SUBNETWORK 41 | ADDRESS OF QoS GUARANTEEING APPARATUS 21 |
| ADDRESS OF EACH CLIENT TERMINAL EXISTING IN SUBNETWORK 42 | ADDRESS OF QoS GUARANTEEING APPARATUS 22 |

IP COMMUNICATIONS NETWORK SYSTEM AND QOS GUARANTEEING APPARATUS

BACKGROUND OF THE INVENTION

The present invention relates to an IP (Internet Protocol) communications network system capable of guaranteeing, based on an RSVP (Resource Reservation Protocol), a QoS (Quality of Service offered by the network) of data communications containing backbone data about an order entry operation, etc. via an IP packet switching network such as the Internet or the Intranet (an intraoffice IP network).

With an advancement of the networking technology as typified by enhancing functions of a local area network (LAN) and expanding the Intranet and an advancement of a personal computer (PC) technology as typified by attaining further multi-functions of the PC and a further speed-up of a Central Processor Unit (CPU) over the recent years, a variety of information can be communicated at a high speed between the PCs on a plurality of LANs (subnetworks) at a stage of its utilization.

Further, a spread of electronic mails (e-mails) and an expansion of WWW (World Wide Web) are seen, and multimedia data such as motion picture information, voice information, etc. are increasingly utilized and spread out. Moreover, an occupying rate of Internet Protocol among protocols used for the data communications rises, and this tendency, it can be presumed, will show a farther progress from now on into the future.

The infrastructures of the networks have been established, wherein the general data communications (IP data communications) are realized without any inconvenience at the present. A demand under this circumstance is that a QoS for every specified IP data communication be guaranteed. For example, with respect to consecutive pieces of multimedia stream data such as the motion picture information and the voice information, network resources such as a transmission bandwidth are reserved based on the RSVP in order to make it feasible to smoothly reproduce the voice information and the motion picture information irrespective of a state of a traffic load on a transmission path between transmitting/receiving entities (the PC and workstation (WS)) and a delay and a jitter are restrained within a fixed range, whereby the QoS guarantee requested can be attained.

At the present, there are commercialized networking devices implementing the RSVP, a PC operating system (OS) adapted itself to the RSVP and multimedia applications corresponding to the RSVP.

Further, there exist data communications of which the QoS guarantee for attaining a low delay, etc. is requested other than the data communications aiming at the multimedia data. For instance, the communications for the backbone data on an order entry operation and a bank accounting operation directly linked to profits of enterprises, are of high importance to the enterprises as well as being the data communications requested to provide a high quality transmission with the delay, etc. restrained. What is required of such data communications is an architecture by which the data can be always transmitted with a low delay regardless of a traffic load state of the network between client terminals and a server (a host computer).

Moreover, those backbone operations are on the shift to the IP coming under the same category as other information communications protocols for the e-mails and the WWW from a conventional SNA (Systems Network Architecture) and FNA (Fujitsu Network Architecture) defined as network architectures (network OS) of the manufactures (vendors) in terms of reducing the network management costs. There is a strong demand for merging information system communications for the WWW and the e-mails with the IP-based backbone communications on one single circuit in terms of decreasing the network management costs. If merged, however, there might arise a problem in which a preferable response of the backbone data communications is hindered because of being oppressed by traffics in other information system communications especially at the WAN exhibiting a comparatively low transmission speed, i.e., at the IP packet switching network.

Accordingly, the present situation is that a leased line is extended separately from the information system communications in order to secure the transmission quality for attaining the low delay in the backbone data communications.

As described above, there is the strong demand for merging the communications protocols with the IP and for reducing the network management costs, however, some sort of architecture for guaranteeing the QoS is needed for the communications of the backbone data exhibiting a high importance. For example, if scheming to apply the RSVP to the QoS guarantee for the backbone communications and the client-to-server communications in which a multiplicity of terminals transmit data packets at random, the RSVP is required to guarantee the QoS on a session basis, in other words, on a TCP/IP (Transmission Control Protocol/Internet Protocol) connection basis, or a UDP/IP (User Datagram Protocol/Internet Protocol) transmission-side and destination port pair basis.

Therefore, if the individual client terminals implement the RSVP for guaranteeing the QoS of each item of data, a networking device such as a router supporting the RSVP must execute the RSVP processes corresponding to the number of terminals (over several hundreds—several thousands of terminals). As a result, a processing load increases, whereas a response is impaired, and the RSVP can not be substantially, if as it is, applied to the QoS guarantee for such communications.

Further, a QoS guarantee target traffic of the RSVP is mainly the multimedia data such as motion picture information, and the RSVP aims at stream data continuing for some consecutive period of time and transmitted substantially at a fixed rate and is therefore hard to apply to the QoS guarantee with respect to each piece of bust data transmitted at random from the multiplicity of terminals.

SUMMARY OF THE INVENTION

Accordingly, it is a primary object of the present invention to provide an IP communications network system and a QoS guaranteeing apparatus which are capable of guaranteeing the QoS as to a delay, etc. with respect to a set of burst data transmitted at random from a multiplicity of terminals by applying the RSVP implemented by a multiplicity of networking manufactures and used as a standard of QoS guarantee protocol.

To accomplish the above object, according to one aspect of the present invention, an IP communications network system comprises first and second QoS guaranteeing apparatuses. The first QoS guaranteeing apparatus includes a distinguishing unit for classifying target traffics in order to guarantee, based on a QoS guarantee protocol, a quality of a set of specified data packets accordant with a specified condition among data packets transmitted from a multiplicity of data communications terminals, an encapsulating unit for encapsulating the specified data packets defined as a QoS guarantee target on the basis of addresses of QoS guaranteeing apparatuses existing on the sides opposite to each other in a QoS guarantee target area in an IP packet switching network so that a set of the traffics appear as if being one session, and a resource reserving unit for reserving resources in accordance with the QoS guarantee protocol with respect to the set of encapsulated specified data packets. The second QoS guaranteeing apparatus existing on the opposite side in the QoS guarantee target area, includes a receiving unit for receiving the encapsulated specified data packets, which have been QoS-guaranteed, via the IP packet switching network, and a de-capsulation unit for de-capsulating the encapsulated specified data packets received in order to forward these packets to an actual destination.

According to another aspect of the present invention, a QoS guaranteeing apparatus comprises a distinguishing unit for classifying target traffics in order to guarantee, based on a QoS guarantee protocol, a quality of a set of specified data packets accordant with a specified condition among data packets transmitted from a multiplicity of data communications terminals, an encapsulating unit for encapsulating the specified data packets defined as a QoS guarantee target on the basis of addresses of QoS guaranteeing apparatuses existing on the sides opposite to each other in a QoS guarantee target area in an IP packet switching network so that a set of the traffics appear as if being one session, and a resource reserving unit for reserving resources in accordance with the QoS guarantee protocol with respect to the set of encapsulated specified data packets.

The QoS guaranteeing apparatus taking this construction may further comprises a receiving unit for receiving the encapsulated specified data packets, which have been QoS-guaranteed, via the IP packet switching network, and a de-capsulation unit for de-capsulating the encapsulated specified data packets received in order to forward these packets to an actual destination, wherein the QoS guaranteeing apparatus faces to a QoS guaranteeing apparatus existing on the opposite side in the QoS guarantee target area.

With this construction being taken, according to the present invention, in the intraoffice IP network where mainly RSVP-adapted networking devices are introduced, it is possible to actualize the QoS guarantee for a set of data packets such as data in backbone communications conceived as important communications which are transmitted at random from a multiplicity of terminals, those data packets being essentially hard to be QoS-guaranteed based on the RSVP. It is also feasible to merge the communications protocols having a high usability by the enterprises with the IP and merge the networks as well, thereby facilitating network management itself and reducing the management costs.

Moreover, the present invention can be applied not only to the backbone data communications but also to other important communications as well as to enhancement of a communications respondency in a client-to-server environment.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

Next, embodiment of the present invention will hereinafter be described with reference to the accompanying drawings.

[Whole Architecture of IP Communications Network System]

Figure 1:
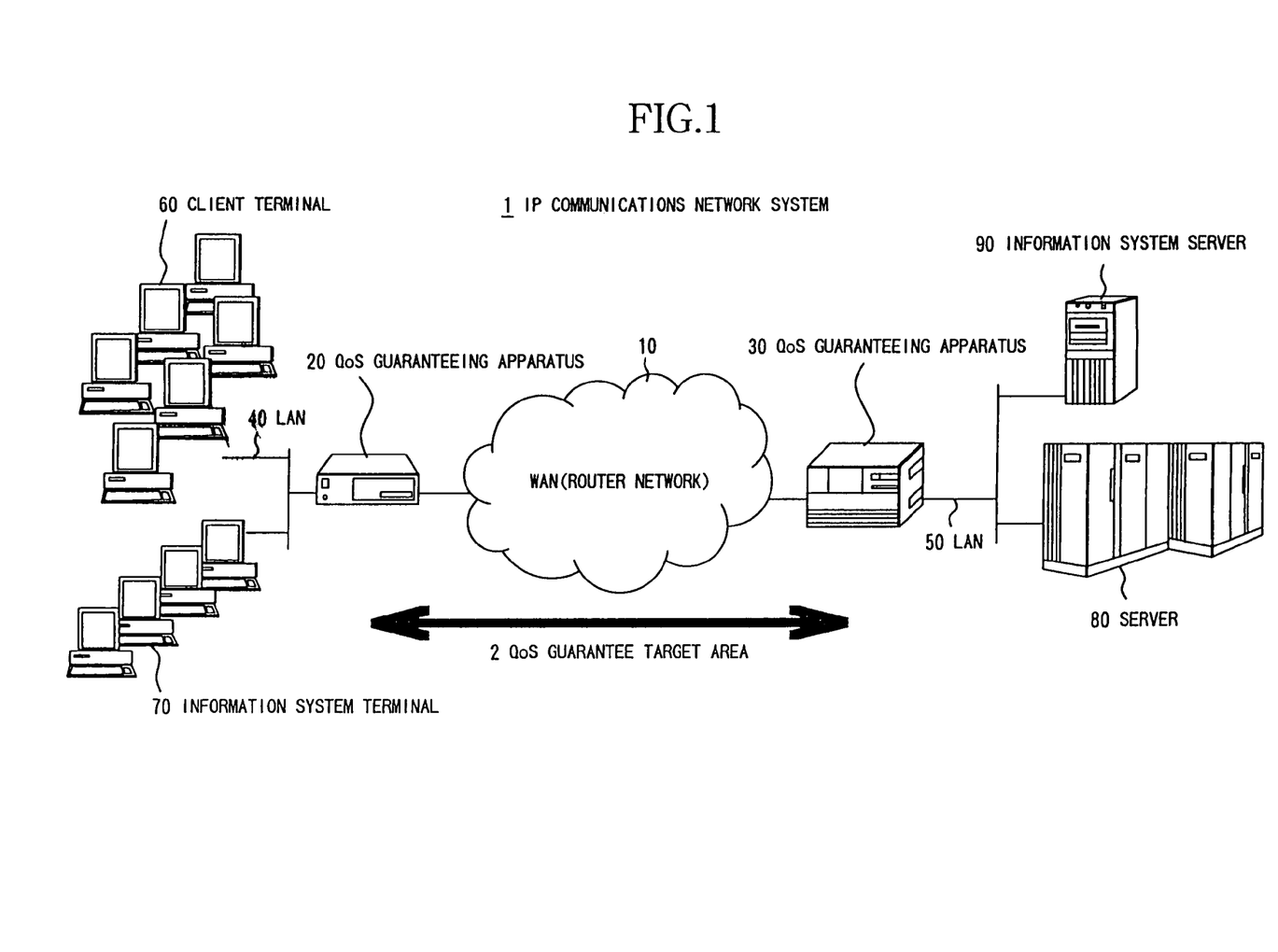
FIG. 1 is a block view showing an architecture of an IP communications network system in one embodiment of the present invention.

FIG. 1 is a view showing an architecture of an IP communications network system in an embodiment of the present invention. Referring to FIG. 1, the network system 1 includes a wide area network (WAN: router network) 10 serving as an IP packet switching network. In this embodiment, the WAN 10 configures the Intranet (an intraoffice IP network). QoS guaranteeing apparatuses 20, 30 are connected to the WAN 10. These QoS guaranteeing apparatuses 20, 30 may be provided in networking equipment such as routers and network servers.

The QoS guaranteeing apparatus 20 on a client side is connected to a local area network (LAN) 40, while the QoS guaranteeing apparatus 30 on a server side is connected to a LAN 50. The LANs 40, 50 each constitute a subnetwork of the network system 1.

The LAN 40 accommodates a plurality of client terminals 60 and a plurality of information system terminals 70. Each of the client terminals 60 and the information system terminals 70 may be a personal computer (PC), and incorporates a data communications function containing voice information. The LAN 50 accommodates a server (a host computer) 80 and an information system server 90.

An area defined by arrowheads is a QoS guarantee target area in the system 1. Herein the information system terminal 70 and the information system server 90 each generate data excluded from the QoS guarantee target.

[Construction of QoS Guaranteeing Apparatus]

Figure 2:
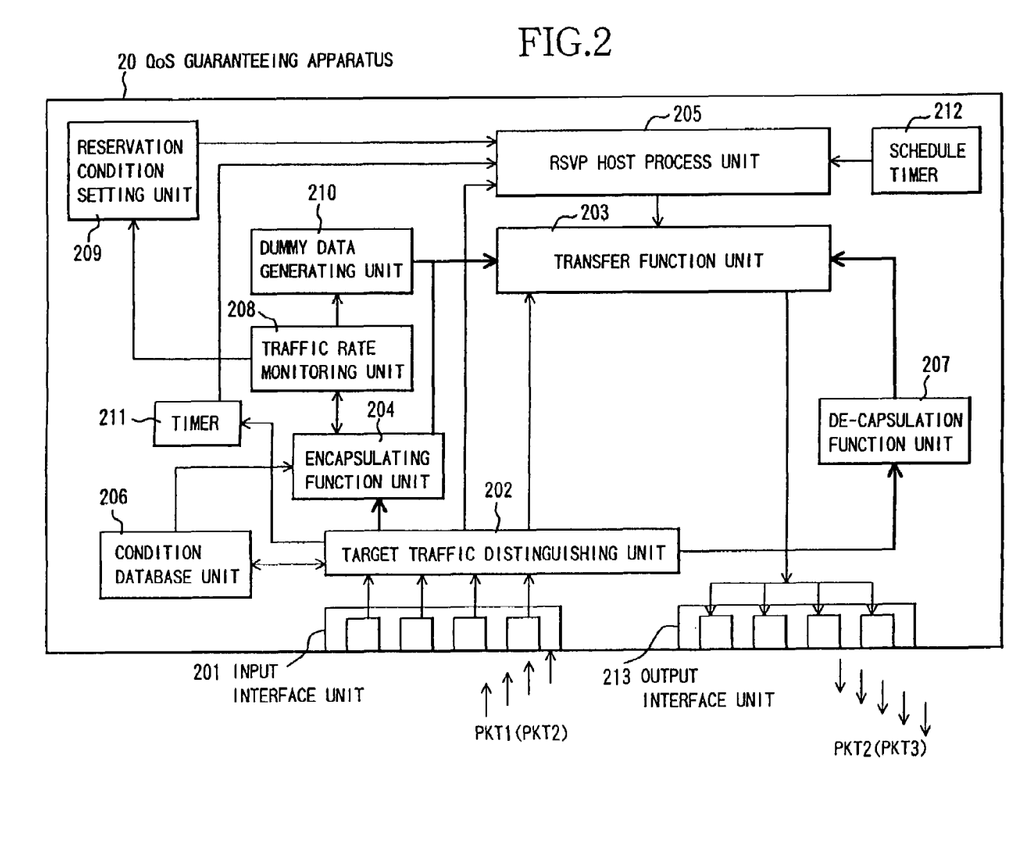
FIG. 2 is a block diagram showing a detailed configuration of a QoS guaranteeing apparatus.

FIG. 2 shows a detailed construction, i.e., components of each of the QoS guaranteeing apparatuses 20, 30. Note that FIG. 2 illustrates the construction of the client-side QoS guaranteeing apparatus 20, however, the server-side QoS guaranteeing apparatus 30 has the same construction.

The QoS guaranteeing apparatus 20 is constructed of an input interface unit 201, a target traffic distinguishing unit 202, a transfer function unit 203, an encapsulating function unit 204, an RSVP host process unit 205, a condition database unit 206, a de-capsulation function unit 207, a traffic rate monitoring unit 208, a reservation condition setting unit 209, a dummy data generation unit 210, a timer 211, a schedule timer 212 and an output interface unit 213. Operations of the QoS guaranteeing apparatuses 20, 30 will hereinafter be explained in depth.

In the QoS guaranteeing apparatus 20, a data packet PKT1 transmitted from the client terminal 60 and a data packet transmitted from the information system terminal 70, are inputted to the input interface unit 201. The output interface unit 213 forwards, to the WAN 10, an encapsulated data packet PKT2 into which the data packet PKT1 coming from the client terminal 60 conceived as a QoS guarantee target is encapsulated and a data packet PKT2 coming from the information system terminal 70.

Further, in the QoS guaranteeing apparatus 20, the encapsulated data packet PKT2 transmitted from the WAN 10 and the data packet ruled out of the QoS guarantee target, are inputted to the input interface unit 201. The output interface unit 213 forwards a de-capsulated data packet PKT3 to the client terminal 60, and the data packet excluded from the QoS guarantee target is outputted to the information system terminal 70.

On the other hand, in the QoS guaranteeing apparatus 30, the data packet eliminated from the QoS guarantee target and the encapsulated data packet PKT2 transmitted from the WAN 10, are inputted to the input interface unit 201. The output interface unit 213 forwards the de-capsulated data packet PKT3 toward the server 80, and the data packet ruled out of the QoS guarantee target toward the information system server 90. Moreover, in the QoS guaranteeing apparatus 30, the data packet PKT1 transmitted from the server 80 is inputted to the input interface unit 201. The output interface unit 213 forwards the encapsulated data packet PKT2 toward the WAN 10. The data packet excluded from the QoS guarantee target, which has come from the information system server 90 remains unprocessed as it is, and transmitted and received (routing).

[Signaling and Resources Ensuring System of RSVP]

Figure 3:
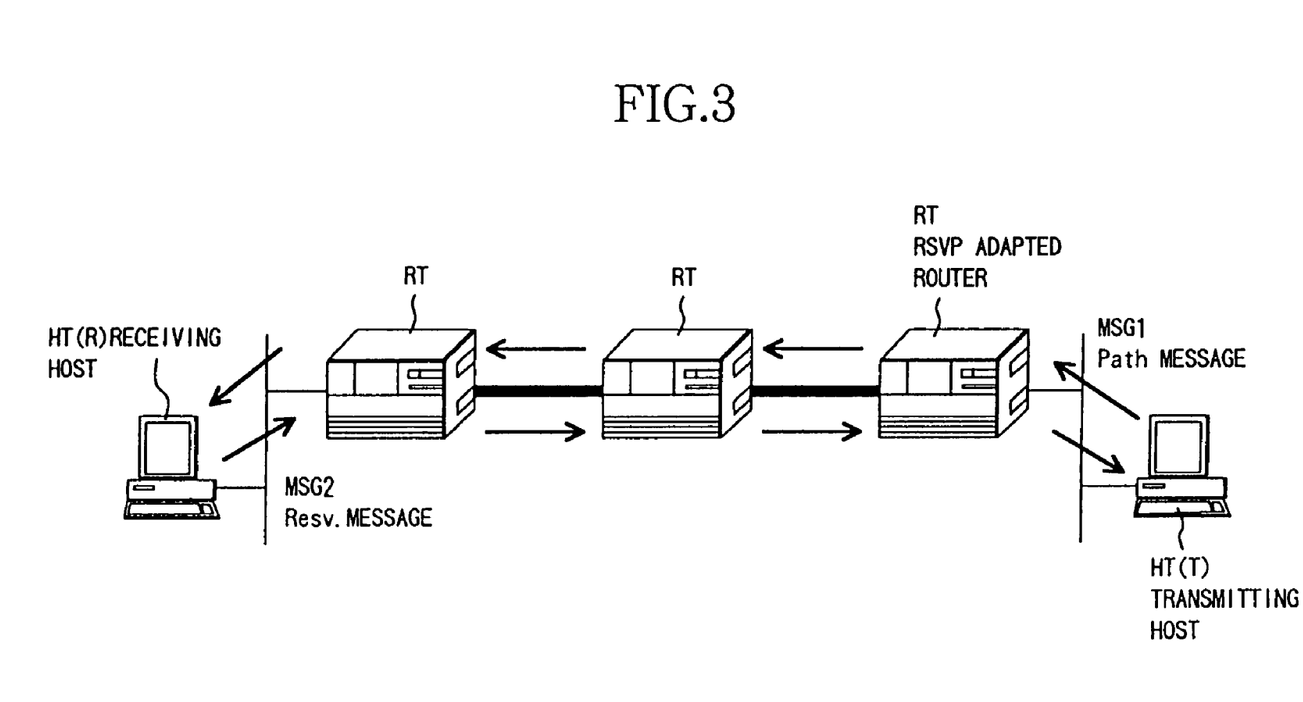
FIG. 3 is an explanatory view showing RSVP signaling.

Next, signaling and a resources ensuring system of RSVP which are applied to the QoS guarantee in the data communications in the IP communications network system 1, will be described with reference to FIGS. 3 and 4.

The RSVP (Resource Reservation Protocol) is defined as a protocol for prescribing procedures of reserving resources such as router-to-router network bands (transmission bandwidths) on the IP packet switching network like the WAN 10 shown in FIG. 1. Basic specifications of the RSVP are prescribed based on RFC2205 (Request For Comments 2205). The RSVP is also a QoS guarantee protocol of the transport layer that is a higher layer of the IP. Actual QoS guarantee services are based on such a premise that a reservation target is the QoS guarantee service prescribed by the working group (IntservWG) of the IETF (Internet Engineering Task Force).

The services prescribed by IntservWG at the present are given as follows. That is:

(1) Controlled-Load Network Element Service: This service (prescribed by RFC2211) provides performances (delay, bit error rate, etc.) equal to the normal Best-Effort type service even when the network is in an overload state.

(2) Guaranteed QoS: This service (prescribed by RFC2212) aims at restraining all end-to-end data transmissions within a designated delay time.

The router RT and a host HT implement the RSVP. In other words, there exist the RSVP-adapted host for making a resource reservation through an RSVP message with respect to a certain item of data, and an RSVP-adapted router for actually reserving a network resource by receiving the RSVP message. Note that the resource reservation is made by a data receiving host HT (R).

A data transmitting host HT (T) transmits an RSVP Path (a path state) message MSG1 in order to notify the host HT (R) of a route and a characteristic of the traffic for transmission. On the other hand, the receiving host HT (R) receives the Path message MSG1, and, if making the resource reservation with respect to the data from the transmitting host HT (T), transmits an RSVP Resv (resource ensuring request) message MSG2. The Resv message MSG2 is transferred to the RSVP-adapted router RT disposed midways and to the transmitting host HT (T) along the route structured based on the Path message MSG1, thereby completing the resource reservation.

It is to be noted that if there exists a router which does not support the RSVP, this router has no guarantee for the bandwidth, however, the data are transferred in a transparent mode. Further, if a reservation content requested is not accepted even in the case of the host HT and the router HT which support the RSVP, for example, if unable to ensure the bandwidth requested because of another bandwidth reservation having already existed, an error message is notified back. If the resource reservation is cancelled, the transmitting host HT (T) transmits a PathTear message, while the receiving host HT (R) transmits a ResvTear message.

Figure 4:
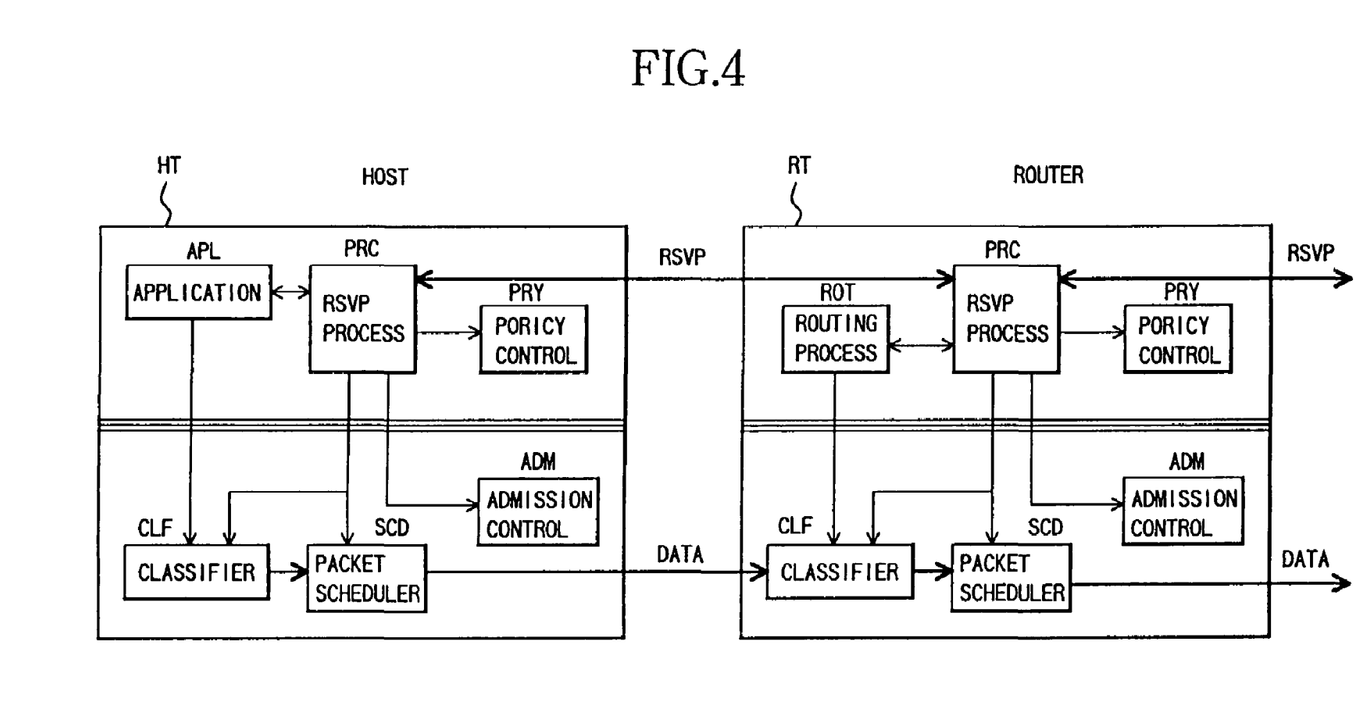
FIG. 4 is a block diagram showing an RSVP-based resource ensuring system.

Referring to FIG. 4, in the system implementing the RSVP, i.e., in the host HT and the router RT which implement the RSVP, an application APL, from which the data is transmitted, forwards a data packet to a packet classifier CLF while communicating with an RSVP process (an RSVP daemon) PRC. The packet classifier CLF classifies the data packets excluded from the QoS guarantee target. A packet scheduler SCD receives the data packets classified by the packet classifier CLF performs scheduling to guarantee the QoS while communicating with the RSVP process PRC, and forwards the packets.

An RSVP QoS control request is transferred to two determination modules such as an admission control ADM and a policy control PRY within respective routing systems on data transmission routes from the data receiving sides. The admission control ADM determines whether or not the system has a capacity enough to ensure the QoS requested. The policy control PRY determines whether or not a client (the user) requesting the QoS is permitted to ensure the QoS. If any conditions with respect to the packets classified by the packet classifier CLF are met, a process of the packet scheduler SCD is executed to guarantee the QoS requested. Note that the a routing process ROT in the router RT is defined as a processing function of a routing table.

[QoS Guarantee Operation in IP Communications Network System]

Next, in an architecture of the IP communications network system 1 in one embodiment of the present invention shown in FIG. 1, i.e., in a network topology for performing the data communications via the WAN 10 between a multiplicity of client terminals 60 and one single server 80, an operation in the case of the QoS guarantee apparatus being installed, will be exemplified.

Referring to FIGS. 1, 2, 5 and 6 in combination, the QoS guarantee apparatus 20 receives the data packet PKT1 via the interface unit 201, in which case a target traffic distinguishing unit 202 examines whether or not the traffic is a QoS guarantee target traffic. For example, if a file transfer and e-mail data transmitted from a multiplicity of information system terminals 70 in the WWW are not targets, those sets of data and files are sent to the transfer function unit 203 and transferred via the output interface unit 213 while remaining unprocessed as they are.

Figure 5:
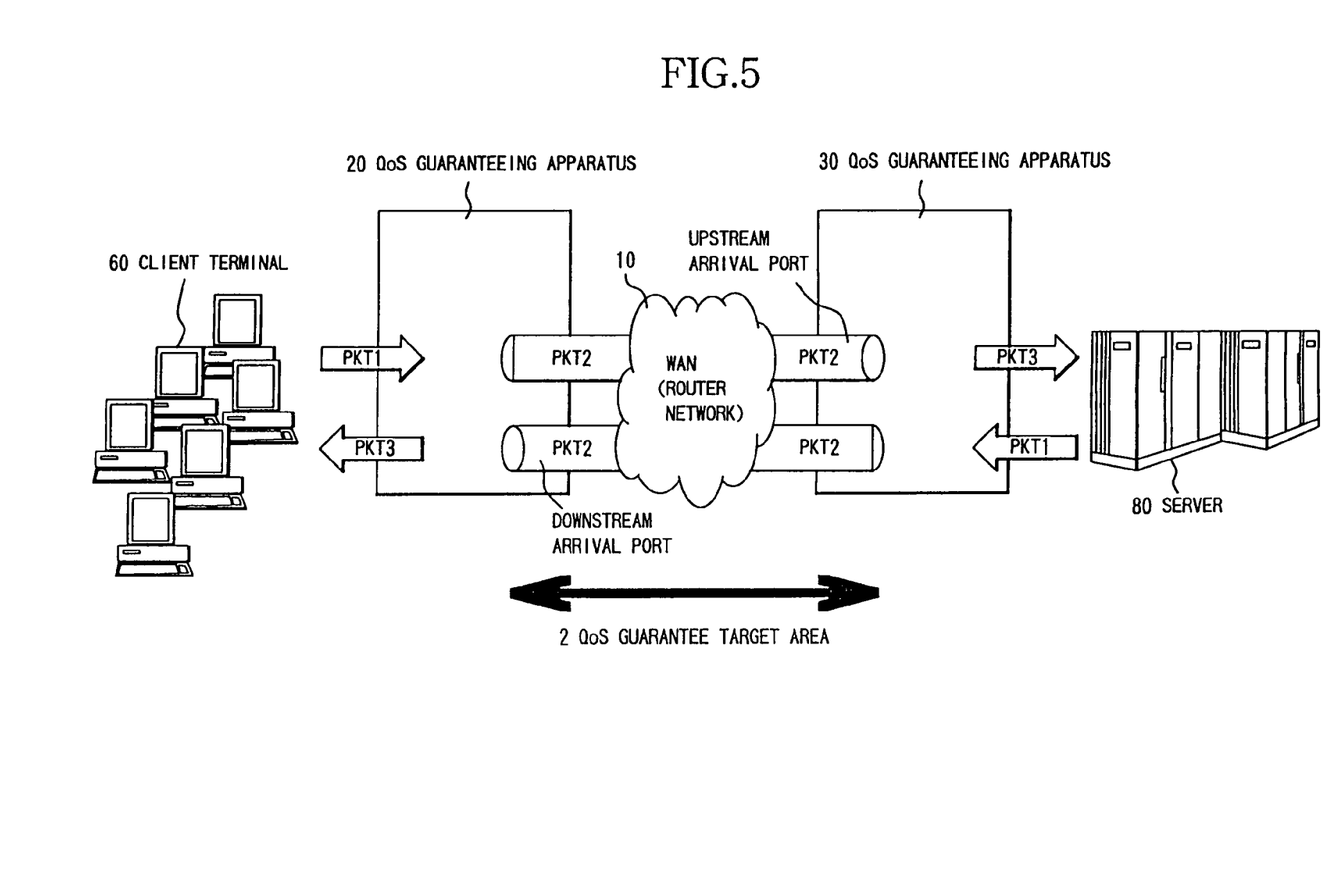
FIG. 5 is an explanatory view showing a concept of tunneling in the IP communications network system.
Figure 6:
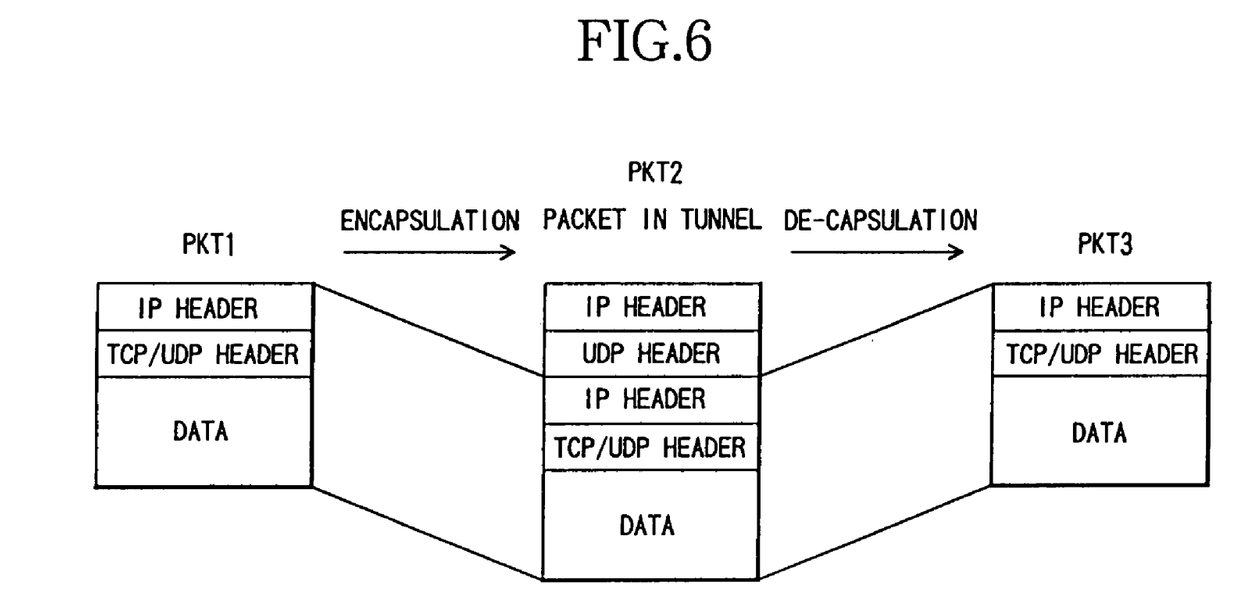
FIG. 6 is a diagram showing how a data packet is encapsulated with UDP/IP headers.

All the QoS guarantee target packets are encapsulated by the encapsulating function unit 204 with IP addresses of the QoS guaranteeing apparatus 30 paired with the QoS guaranteeing apparatus 20 with the registered WAN 10 being interposed therebetween. To see it from another angle, as shown in FIG. 5, tunnels are formed between the QoS guaranteeing apparatuses 20 and 30, and all the QoS guarantee target packets are transferred by tunneling. With this tunneling transfer, the QoS guaranteeing apparatuses 20 and 30 apparently become those which forward all the QoS guarantee target packets, i.e., become transmitting hosts implementing the RSVP. With respect to those packets, the RSVP host process unit 205 transmits the RSVP Path message MSG1, thus making a network resource reservation between the QoS guaranteeing apparatuses.

As a result, the QoS can be guaranteed by only one resource reservation process of the RSVP with such a contrivance that a group of QoS guarantee target packets transmitted from the multiplicity of client terminals 60 appear as if being apparently data in one session.

Normally, in the case of guaranteeing a whole communication response of an operation communications application operating at the client terminal 60, it is required that the bidirectional data be guaranteed in terms of the QoS, and, with respect to the response data from the server (the host computer) 80, the QoS guaranteeing apparatus existing in that network executes the same process, whereby the QoS guarantee can be thus actualized.

As a method of distinguishing the QoS guarantee target packet, the target traffic distinguishing unit 202 examines destination addresses of the data packets, thereby making it feasible to distinguish between the data packet and the QoS guarantee target packet. A condition as to which destination address comes under the QoS guarantee is previously registered in the condition database unit 206 which will be referred to. This method can be applied to a case where if an address of a target server is designated in client-to-server communications, this is set as a QoS guarantee target.

That is to say, if the data to the information system server 90 is ruled out of the QoS guarantee target, an address thereof is not registered in the condition database unit 206. When scheming to give the QoS guarantees to the response data to the multiplicity of client terminals (a client terminal group) 60 from the server side, the address of each client terminal 60 is registered in the condition database unit 206 of the QoS guaranteeing apparatus 30 on the server side, thereby sorting out the QoS guarantee target traffic.

Further, if the address of each client terminal 60 is set as a condition in the case of targeting the response data given from the server, or alternatively if there are an extremely large number of client terminals, all of which are the client terminals 60 serving as the QoS guarantee targets, only an address of the subnetwork to which the client terminal group belongs, i.e., only an address of the LAN 40 is registered, and the QoS guarantee target traffic is sorted out by examining this address. This method may be, as a matter of course, applied to the QoS guaranteeing apparatus 20 on the client side.

Another method of distinguishing the QoS guarantee target packet is that a transmitting destination address becoming a target is registered in the condition database unit 206, and can be thus used. An address of the client terminal 60 performing the communications for the QoS guarantee target is registered in the condition database unit 206, while an address of the server 8 as a target is registered in the QoS guaranteeing apparatus 30 on the server side. This method can be thus actualized.

If there are a multiplicity of client terminals 60 in a certain subnetwork (LAN), there might be a possibility in which the number of addresses for registration becomes enormous. Further, if only the client terminals 60 performing only the communications for the QoS guarantee target exist in a certain subnetwork, only and address of that subnetwork may be registered in the condition database unit 206.

Moreover, for instance, SNA and FNA may be given as protocols used for the backbone communications. In the case of SNA on TCP/IP, however, a port number is [108] (SNA Gateway Access Server) or [1439] (/tcp Eicon X.25/ SNA Gateway), or in the case of FNA on TCP/IP, the port number is [492] or [493] (Transport Independent Convergence for FNA). The port number is thus determined by the assignment of IANA (Internet Assigned Number Authority), and hence those destination port numbers are registered in the condition database unit 206, and the QoS guarantee target packet can be distinguished by use of those port numbers.

Only the backbone terminals are installed in the subnetwork connected to the interface unit 201 existing in the QoS guaranteeing apparatus, and the normal PCs, etc. are connected to another subnetwork. Based on this topology, when scheming to guarantee only a quality of the backbone data communications, there may also be guaranteed the QoS with respect to only the packet group inputted to the interface unit 201 of the QoS guaranteeing apparatus connected to the subnetwork. In this case, a processing load upon the QoS guaranteeing apparatus can be reduced.

For processing the data transmitted from the multiplicity of client terminals 60 by one single RSVP process, viz., by the RSVP host process unit 205, a contrivance is that the respective packets appear as if occurring in one single session, and it is required that the resource reservation be made based on the RSVP for those packets. For attaining this, the packets may be tunneled so that the destination address, the destination port number and the protocol ID are the same, and the packet of each client terminal 60 may be encapsulated with an IP header and a UDP header having destination port number fields in a transport layer header (UDP header) at [17] with which a protocol number in the IP header indicates UDP (see FIG. 6).

To be more specific, the UDP port used for tunneling by the QoS guaranteeing apparatus and the IP address of QoS guaranteeing apparatus as a terminal of the tunnel, i.e., paired with the above QoS guaranteeing apparatus, are registered in the encapsulating function unit 204. The QoS guarantee target packets are sorted out by use of the UDP port and the IP address, and thereafter the packets may be encapsulated and thus transferred.

The UDP/IP is comparatively light in terms of processing and incorporates no re-forwarding function with respect to lost data and damaged data. Hence, for enhancing a reliability on the data transmission in tunneling, the packets are encapsulated with TCP/IP of which an IP header contained protocol number is [6], and the resource reservation may be made based on the RSVP with respect to those encapsulate packets.

Further, the data, which have been transmitted in the form of the encapsulated packets between the QoS guaranteeing apparatuses and received by the QoS guaranteeing apparatus at the set specified UDP port or TCP port, are de-capsulated by the de-capsulation function unit 207 by removing the added UDP/IP header or TCP/IP header therefrom so that the data can be received by the server 80 normally conceived as a destination or each client terminal 60 in the reverse direction. Those pieces data are transmitted as the (original) packets PKT1 or PKT3 with no encapsulation from the transfer function unit 203.

[QoS Guarantee Operation in Other IP Communications Network System Architecture]

Figure 7:
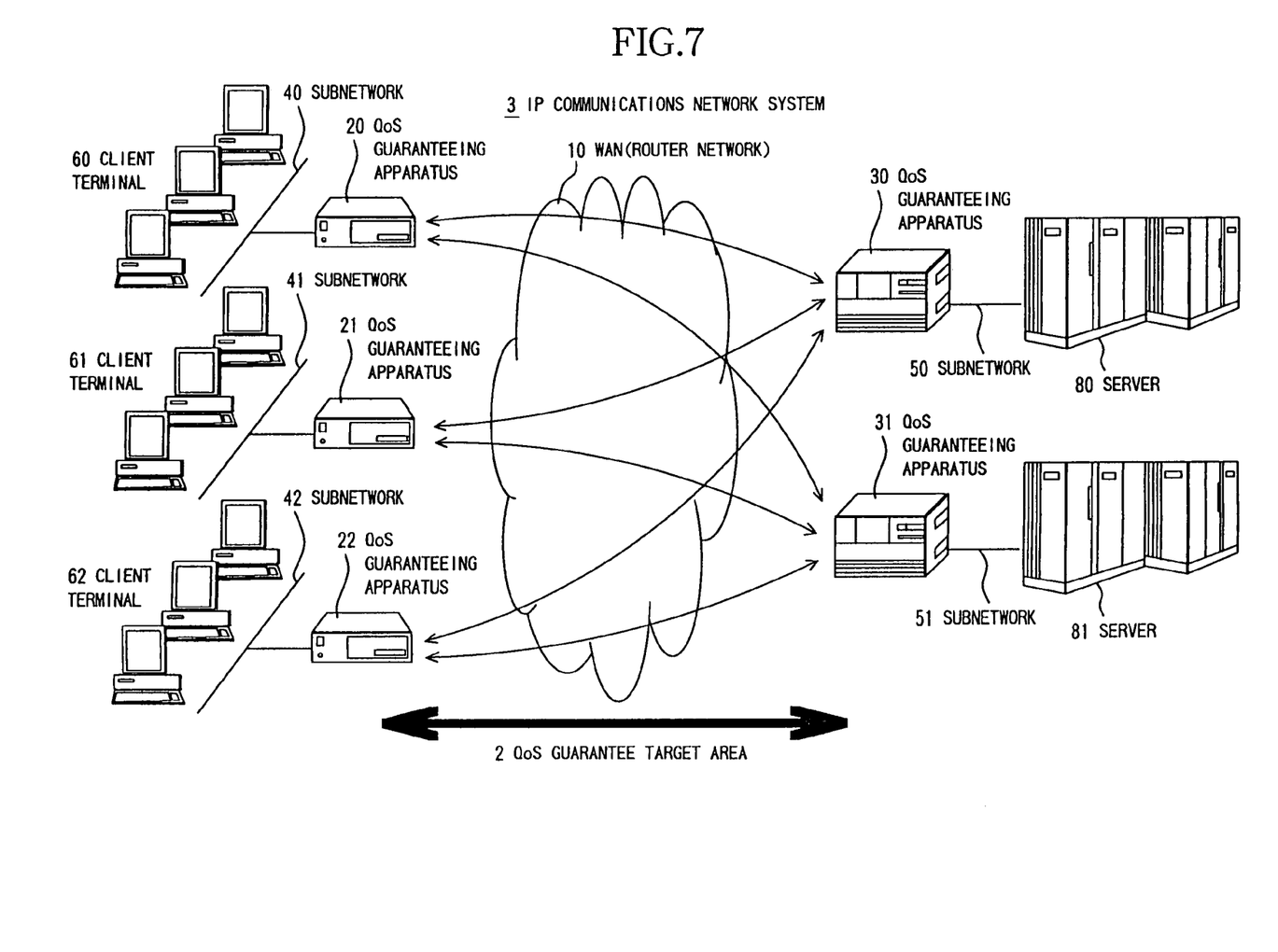
FIG. 7 is a block view showing an architecture of the IP communications network system in another embodiment of the present invention.

Next, FIG. 7 shows an architecture of an IP communications network system 3 in another embodiment of the present invention. That is to say, a network topology is that there exist a plurality of subnetworks (LANs) 50, 51, with the WAN 10 being interposed therebetween, to which subnetworks (LANs) 40, 41, 42 to which the multiplicity of client terminals (a group of client terminals) 60, 61, 62 belong and servers (host computers) 80, 81 are subordinate. An example of the operation in the case of guaranteeing the QoS in the data communications in this topology, will be explained.

Figure 8:
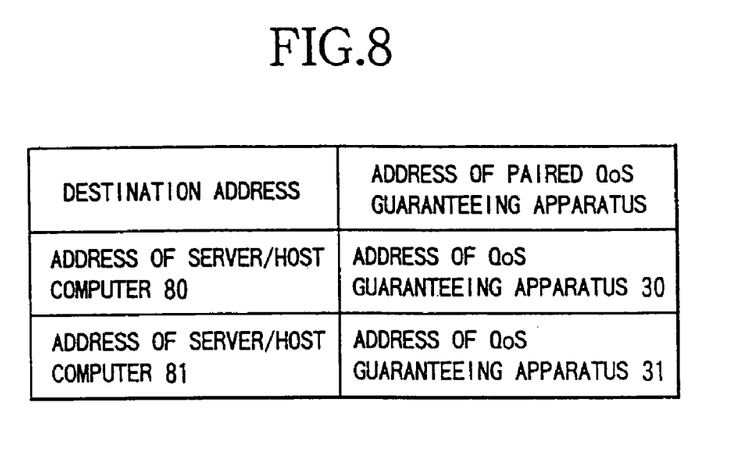
FIG. 8 is a table showing a condition database of the QoS guaranteeing apparatus on a client side.
Figure 9:
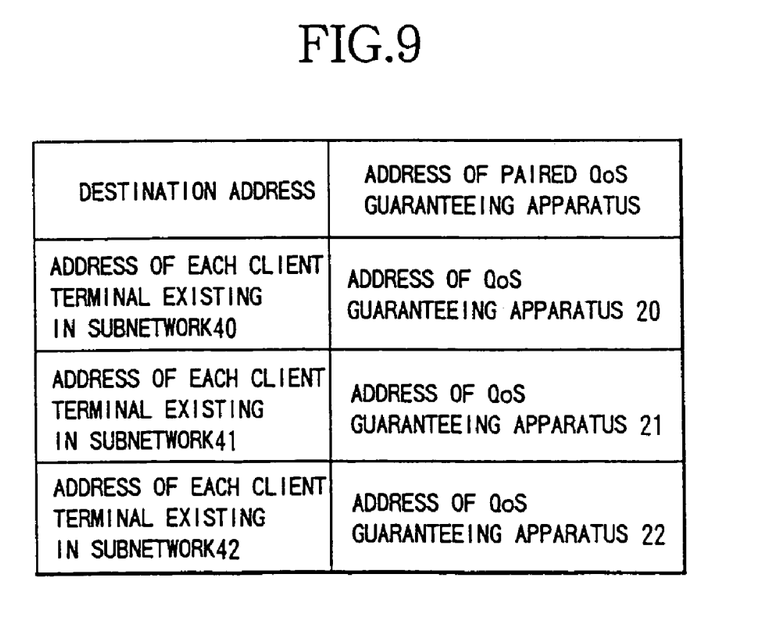
FIG. 9 is a table showing a condition database of the QoS guaranteeing apparatus on a server side.

FIGS. 8 and 9 show databases of the QoS guaranteeing apparatuses 20, 21, 22 on the client side and of the QoS guaranteeing apparatuses 30, 31 on the server side (the components of each QoS guaranteeing apparatus will be described based on the component of the QoS guaranteeing apparatus shown in FIG. 2). Referring to FIGS. 2, 5, 6, 7, 8 and 9 in combination, when considering a case where the QoS guarantee target packets are sorted out with the destination addresses, as shown in FIGS. 8 and 9, the same number of pair-address entries as the number of conditions are given, wherein each entry in one direction consists of a pair of addresses, i.e., an address for sorting out the QoS guarantee target packet and an address of the server that should be a destination of the packet having the above address, and the entry in the opposite direction consists of a pair of addresses, viz., an address of each of the client terminals 60, 61, 61 belonging to the subnetworks 40, 41, 42 and an address of each of the QoS guaranteeing apparatuses 20, 21, 22 provided in those subnetworks.

Then, after sorting out the QoS guarantee target packets, the encapsulating function unit 204 is given these sorted packets and encapsulates the same packets with the addresses of the QoS guaranteeing apparatuses paired with and corresponding to those on the other side, and the resource reservation is made based on the RSVP per destination with respect to those packets. As illustrated in FIG. 7 the operation can thereby correspond to a case where the plurality of destination networks exist.

Further, for instance, in the network topology shown in FIG. 7, the operation can correspond to a case in which a plurality of servers 80 exist in a subnetwork 50 by registering not [server/host-computer addresses] shown in FIG. 8 but all of [addresses of the servers 80 existing in the subnetwork 50].

Moreover, if there are a large number of client terminals, the addresses of the subnetworks are registered as a substitute for the addresses of all the client terminals in the condition database unit 206 of the QoS guaranteeing apparatus on the server side, and the number of entries themselves may be decreased.

Furthermore, for example, in such a case that a specified destination port number is used for every backbone application, instead of the address and the subnetwork address, the port number (not the port number when encapsulated but the destination port number of the original data PKT1) is registered, and this registered port number may also be used.

Further, those port numbers may be combined and registered in the condition database unit 206, whereby the operation can correspond to such a case that there is a congestion of the client terminals using the backbone applications, wherein the destinations are the same but the port numbers used are different.

For guaranteeing the traffic QoS on the basis of the RSVP, the data transmitting side must designate a data rate of the traffic with the RSVP Path message MSG1. Normally, in the backbone communications with a large number of client terminals and other client-to-server communications, a total data rate of the respective client terminals or a rate of the response data from the server is comparatively fixed. Unlike single multimedia stream data, however, there might be, it is considered, a slight error in the total sum of the data rates.

Such being the case, in order to establish the QoS guarantee, the traffic rate monitoring unit 208 monitors a total data quantity of the QoS guarantee target data, and, if a difference occurs, the dummy data generating unit 210 generates and transmits dummy data packets corresponding to the difference, thereby making the data rate constant. The dummy data packets in this case are the same as the actually encapsulated data packets, more specifically, the UDP/IP data of the TCP/IP data having the port number for the tunnel data and the IP address of the QoS guaranteeing apparatus which is paired with the destination IP address.

In this case, there can be considered a method of forwarding a required quantity of packets of which payloads are fixed, or supplementing a difference with a size of the payload. The actual operation may take such a mode that the data rate designated by the RSVP Path message MSG1 is set somewhat larger than a peak rate, and the difference is supplemented with the dummy data packets. According to this method, a network bandwidth for the dummy data packets is used with a futility, however, the QoS guaranteeing apparatus can operate by a lighter RSVP process than by a method which follows.

There may be taken this method in which the traffic rate monitoring unit 208 monitors the total data quantity of the QoS guarantee target data and, if a difference occurs, a parameter coincident with that data rate is designated in the reservation condition setting unit 209. Then, the RSVP Path message MSG1 after being changed is transmitted, and a reservation condition is adapted to the actual rate. The reservation remade by changing the reservation condition each time a slight fluctuation occurs, might lead to heaviness of the RSVP process, and hence there can be considered, for instance, such an operation that the reservation condition is changed each time a 10 Kbps fluctuation is detected since the reservation time of the last time.

For effectively utilizing the resources and reducing the processing load, a timing when the target traffic distinguishing unit 202 detects a QoS guarantee target traffic, becomes a trigger for starting the network resource reservation based on the RSVP, whereby the RSVP host process unit 205 is indicated to start transmitting the Path message MSG1.

Further, the timer 211 is provided in the QoS guaranteeing apparatus and operates just when the target traffic distinguishing unit 202 detects no QoS guarantee target traffic. At a point of time when the set time expires, the time gives an indication to the RSVP host process unit 205, and the resource reservation is cancelled by transmitting the RSVP PathTear message, whereby the resources can be likewise effectively utilized and the processing load can be reduced as well.

Further, as in the case of an order entry operation, the QoS is guaranteed for the data communications of the operation conducted only for business hours for enterprise customers such as, e.g., 10:00–18:00, in which case there may be adopted such an operation that a schedule timer 212 is provided, and the resources are always reserved within a certain time range.

In an environment where the multimedia are frequently used at the same time, the multimedia data are QoS-guaranteed by the RSVP and thus transmitted in some cases, however, the network band is occupied by other sessions, and there might be a case in which the band to be secured for the operation can not be ensured. For avoiding this situation, it may be preferable that the reservation is always kept by starting the RSVP signaling when starting up the QoS guaranteeing apparatus, i.e., by starting the transmission of the Path message MSG1 and the Resv message MSG2.

In this case, the RSVP-based resource reservations for other data can not simply be utilized to a degree corresponding to the reservations secured for the QoS guarantee target data, and, if there is no QoS guarantee target data, there does not arise a serious problem because all the transmission path bands are usable by other traffics.

[Modified Example]

The QoS guarantee function described above may be incorporated into the router provided at the entrance of the subnetwork or the entrance to the WAN, or into a workstation (WS) existing on the path of the data and a network server such as a PC server. In this case, the transfer function unit may be given a routing function possessed by the normal router.

Further, it is unnecessary for all the routers within the router network as an intraoffice IP network (the Intranet) to incorporate the QoS guarantee function described above. Therefore, for reducing the produce price, for example, the WS and the PC are given the same function, and one single WS or PC may be installed per subnetwork. In this case, it follows that each client terminal and server (the host computer) transmits the data addressed to this device, and, for sorting out the QoS guarantee target packets, a source (transmission-side) address and a destination port number are set in the database unit and thus used.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. An IP communications network system comprising:
   a first QoS guaranteeing apparatus including:
      a condition database unit storing conditions specifying destination addresses with a QoS guarantee;
      a distinguishing unit working in conjunction with said condition database for classifying, as target traffics, specified data packets accordant with a specified condition among data packets transmitted from a multiplicity of data communications terminals;
      an encapsulating unit for encapsulating the classified specified data packets defined as a QoS guarantee target on the basis of IP addresses of two QoS guaranteeing apparatuses existing on the sides opposite to each other in a QoS guarantee target area in an IP packet switching network so that a set of the traffics appear as if being one session; and
      a resource reserving unit for reserving resources in accordance with the QoS guarantee protocol with respect to the set of encapsulated specified data packets, and
   a second QoS guaranteeing apparatus existing on the opposite side in the QoS guarantee target area, including:
      a receiving unit for receiving the encapsulated specified data packets, which have been QoS-guaranteed, via the IP packet switching network; and
      a de-capsulation unit for de-capsulating the encapsulated specified data packets received in order to forward these packets to an actual destination.

2. A QoS guaranteeing apparatus comprising:
   a condition database unit storing conditions specifying destination addresses with a QoS guarantee;
   a distinguishing unit working in conjunction with said condition database for classifying, as target traffics, specified data packets accordant with a specified condition among data packets transmitted from a multiplicity of data communications terminals;
   an encapsulating unit for encapsulating the classified specified data packets defined as a QoS guarantee target on the basis of addresses of QoS guaranteeing apparatuses existing on the sides opposite to each other in a QoS guarantee target area in an IP packet switching network so that a set of the traffics appear as if being one session; and
   a resource reserving unit for reserving resources in accordance with the QoS guarantee protocol with respect to the set of encapsulated specified data packets.

3. A QoS guaranteeing apparatus according to claim 2, further comprising:
   a receiving unit for receiving the encapsulated specified data packets, which have been QoS-guaranteed, via the IP packet switching network; and
   a de-capsulation unit for de-capsulating the encapsulated specified data packets received in order to forward these packets to an actual destination,
   wherein the QoS guaranteeing apparatus faces to a QoS guaranteeing apparatus existing on the opposite side in the QoS guarantee target area.

4. A QoS guaranteeing apparatus according to claim 2, wherein the QoS guarantee protocol is an RSVP protocol.

5. A QoS guaranteeing apparatus according to claim 2, wherein the IP packet switching network is the Intranet.

6. A QoS guaranteeing apparatus according to claim 2, wherein the IP packet switching network is constructed of a wide area network.

7. A QoS guaranteeing apparatus according to claim 2, wherein the distinguishing unit classifies the target traffics by distinguishing the specified data packets on the basis of a destination address of each of the data packets transmitted from the multiplicity of data communications terminals.

8. A QoS guaranteeing apparatus according to claim 2, wherein the distinguishing unit classifies the target traffics by distinguishing the specified data packets on the basis of a destination network address of each of the data packets transmitted from the multiplicity of data communications terminals.

9. A QoS guaranteeing apparatus according to claim 2, wherein the distinguishing unit classifies the target traffics by distinguishing the specified data packets on the basis of a source address of each of the data packets transmitted from the multiplicity of data communications terminals.

10. A QoS guaranteeing apparatus according to claim 2, wherein the distinguishing unit classifies the target traffics by distinguishing the specified data packets on the basis of a source network address of each of the data packets transmitted from the multiplicity of data communications terminals.

11. A QoS guaranteeing apparatus according to claim 2, wherein the distinguishing unit classifies the target traffics by distinguishing the specified data packets on the basis of a destination port number of each of the data packets transmitted from the multiplicity of data communications terminals.

12. A QoS guaranteeing apparatus according to claim 2, wherein the distinguishing unit classifies the target traffics by distinguishing the specified data packets on the basis of a receiving interface of each of the data packets transmitted from the multiplicity of data communications terminals.

13. A QoS guaranteeing apparatus according to claim 2, wherein the encapsulating unit encapsulates the QoS guarantee target specified data packets with UDF/IP on the basis of addresses of interfaces of face-to-face apparatuses existing on the sides opposite to each other in the QoS guarantee area in the IP packet switching network so that the set of traffics appears as if being one session.

14. A QoS guaranteeing apparatus according to claim 2, wherein the encapsulating unit encapsulates the QoS guarantee target specified data packets with TCP/IP on the basis of addresses of interfaces of face-to-face apparatuses existing on the sides opposite to each other in the QoS guarantee area in the IP packet switching network so that the set of traffics appears as if being one session.

15. A QoS guaranteeing apparatus according to claim 2, further comprising:
a determining unit for determining the QoS guaranteeing apparatus serving as a destination and existing on the opposite side by examining a destination address of each of the specified data packets while referring to a storage unit for storing, if there are plurality of destinations of the set of the QoS guarantee target specified data packets, pairs of addresses of the QoS guaranteeing apparatuses existing on the opposite side in the QoS guarantee target area and destination addresses of the QoS guarantee target specified data packets while making these pairs of addresses corresponding to each other.

16. A QoS guaranteeing apparatus according to claim 2, further comprising:
a determining unit for determining the QoS guaranteeing apparatus serving as a destination and existing on the opposite side by examining a destination network address of each of the specified data packets while referring to a storage unit for storing, if there are plurality of destinations of the set of the QoS guarantee target specified data packets, pairs of addresses of the QoS guaranteeing apparatuses existing on the opposite side in the QoS guarantee target area and network addresses of subtnetworks connected to the respective QoS guaranteeing apparatuses on the opposite side while making these pairs of addresses corresponding to each other.

17. A QoS guaranteeing apparatus according to claim 2, further comprising:
a determining unit for determining, the QoS guaranteeing apparatus serving as a destination and existing on the opposite side by examining a destination port number of each of the QoS guarantee target specified data packets while referring to a storage unit for storing, if there are plurality of destinations of the set of the QoS guarantee target specified data packets, pairs of addresses of the QoS guaranteeing apparatuses existing on the opposite side in the QoS guarantee target area and destination port numbers of the QoS guarantee target specified data packets while making these pairs of addresses and port numbers corresponding to each other.

18. A QoS guaranteeing apparatus according to claim 2, further comprising:
a generating unit for monitoring a total data quantity of the QoS guarantee target traffic, then, if a transmission rate fluctuates, generating dummy data packets of which a quantity corresponds to a difference rate, and transmitting those dummy data packets in order to keep constant a total transmission rate of the QoS guarantee target traffic.

19. A QoS guaranteeing apparatus according to claim 2, further comprising:
a changing unit for monitoring a total data quantity of the QoS guarantee target traffic and, if a transmission rate fluctuates, dynamically changing a resource reservation condition based on the QoS guarantee protocol.

20. A QoS guaranteeing apparatus according to claim 2, further comprising:
a reservation canceling unit for monitoring the QoS guarantee target traffic, then, if the QoS guarantee target traffic is not received, starting up a timer, and, if the QoS guarantee target traffic is not again received until a period of time set in the timer expires, canceling the resource reservation based on the QoS guarantee protocol.

21. A QoS guaranteeing apparatus according to claim 2, further comprising:
an executing unit for executing the resource reservation based on the QoS guarantee protocol within a predetermined time range with reference to a schedule timer.

22. An IP communications network system according to claim 1, wherein functions possessed by the first and second QoS guaranteeing apparatuses are incorporated into other devices existing on network paths.

23. An IP communications network system according to claim 1, wherein functions possessed by the first and second QoS guaranteeing apparatuses are incorporated into other devices which do not exist on network paths.

* * * * *